(No Model.)

F. H. ULLRICH.
TAILOR'S BACK AND SHOULDER ANGLE MEASURE.

No. 250,854.  Patented Dec. 13, 1881.

WITNESSES:
Carl Kay
Jno. N. Rosenbaum

INVENTOR
Friedrich H. Ullrich
BY Paul Goepel
ATTORNEY

UNITED STATES PATENT OFFICE.

FRIEDRICH H. ULLRICH, OF NEW YORK, N. Y.

TAILOR'S BACK AND SHOULDER ANGLE MEASURE.

SPECIFICATION forming part of Letters Patent No. 250,854, dated December 13, 1881.

Application filed September 1, 1881. (No model.)

*To all whom it may concern:*

Be it known that I, FRIEDRICH H. ULLRICH, of the city, county, and State of New York, have invented certain new and useful Improvements in Tailors' Back and Shoulder Angle Measures, of which the following is a specification.

This invention has reference to an improved device for determining the angle of deviation of the back or shoulder of the body from a vertical line, to be used by tailors and dress and shirt makers in connection with a set of correspondingly-constructed patterns for cutting garments, so as to facilitate thereby not only the taking of measures, but produce also better-fitting garments.

The invention consists of a rectangular plate, which is rounded off at one corner and provided with a double-graduated quadrantal scale, along which swings a pendulum which is pivoted to the center of the circle upon which the scale is curved.

Figure 1:
Figure 2:
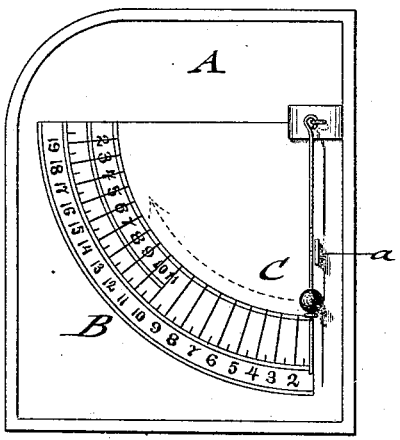

In the accompanying drawings, Figure 1 represents a perspective view of my improved tailors' back and shoulder angle measure, shown in position to determine the angle of the back; and Fig. 2 is a detail front view of the measure.

Similar letters of reference indicate corresponding parts.

A represents a rectangular plate of sheet metal, pasteboard, or other suitable material, which is rounded off at one corner, so that the plate can be applied by its longer adjoining side to the back or shoulder without interfering with the neck. On the face of the plate A is arranged a graduated scale, B, of quadrantal shape, said scale being graduated from opposite ends, as shown in Fig. 2, so as to form two scales, of which one serves to read off the angle of deviation of the back from a vertical line, the other that of the shoulder from a horizontal line. The numbers of the scale B correspond with a series of patterns, which are constructed in such a manner as to provide for the different deviations of the back or shoulder of the body from a normal figure.

To the center of the curve of the quadrantal scale B is pivoted a pendulum, C, which is retained by a stop, $a$, at the starting-point at one end of the scale B. The pendulum C indicates by its position on the scales the angle of deviation of the back or shoulder from a vertical or horizontal line, respectively, for the purpose of indicating thereby directly which pattern is to used for cutting. The angle-measure serves also to facilitate the tedious measuring of the body, as, besides the angles mentioned, only the chest and waist measures require to be taken, the remaining measures being furnished by the pattern. The angle-measure is thus designed to assist tailors and others who have to make garments to order in getting an excellent fit without the necessity of cutting a pattern for each special case, as by the angle read off at the scale the number of the pattern to be used is indicated, while the remaining measures determine the size of the pattern.

Having thus described my invention, I claim as new and desire to secure by Letters Patent—

A back and shoulder angle measure for tailors, consisting of a rectangular plate rounded off at one corner and having a double quadrantal scale, and of a pendulum pivoted to the center of the quadrantal scale, substantially as and for the purpose set forth.

In testimony that I claim the foregoing as my invention I have signed my name, in presence of two witnesses, this 24th day of August, 1881.

FRIEDRICH H. ULLRICH.

Witnesses:
PAUL GOEPEL,
CARL KARP.